United States Patent
Asrani et al.

(10) Patent No.: US 8,483,632 B2
(45) Date of Patent: Jul. 9, 2013

(54) RADIATED POWER CONTROL SYSTEMS AND METHODS IN WIRELESS COMMUNICATION DEVICES

(75) Inventors: Vijay Asrani, Round Lake, IL (US); Matthew Biggerstaff, Spring Grove, IL (US); Greg Black, Vernon Hills, IL (US); Arthur Christopher Leyh, Spring Grove, IL (US); Pete Nanni, Algonquin, IL (US); Adrian Napoles, Lake Villa, IL (US); Ben White, Crystal Lake, IL (US)

(73) Assignee: Motorola Mobility LLC, Libertyville, IL (US)

( * ) Notice: Subject to any disclaimer, the term of this patent is extended or adjusted under 35 U.S.C. 154(b) by 538 days.

(21) Appl. No.: 12/618,121

(22) Filed: Nov. 13, 2009

(65) Prior Publication Data

US 2011/0117973 A1 May 19, 2011

(51) Int. Cl.
*H01Q 11/12* (2006.01)
*G04B 1/04* (2006.01)

(52) U.S. Cl.
USPC ........................................ 455/117; 455/127.2

(58) Field of Classification Search
USPC ................... 455/115.1, 115.3, 117, 120, 121, 455/123, 125, 127.1, 127.2
See application file for complete search history.

(56) References Cited

U.S. PATENT DOCUMENTS

| | | | |
|---|---|---|---|
| 5,524,275 A * | 6/1996 | Lindell | 455/117 |
| 6,064,868 A | 5/2000 | Kobayashi | |
| 6,657,595 B1 | 12/2003 | Alameh et al. | |
| 7,167,135 B2 | 1/2007 | Kipnis et al. | |
| 7,199,762 B2 | 4/2007 | Liu et al. | |
| 2002/0095304 A1* | 7/2002 | Khazei | 705/1 |
| 2003/0064761 A1* | 4/2003 | Nevermann | 455/572 |
| 2004/0121799 A1* | 6/2004 | Chiou | 455/550.1 |
| 2005/0124305 A1* | 6/2005 | Stichelbout | 455/117 |
| 2007/0200766 A1 | 8/2007 | McKinzie et al. | |
| 2007/0232367 A1 | 10/2007 | Kasha et al. | |
| 2009/0124294 A1* | 5/2009 | Kim et al. | 455/566 |
| 2009/0219214 A1 | 9/2009 | Oh et al. | |
| 2010/0167664 A1* | 7/2010 | Szini | 455/73 |
| 2011/0014886 A1* | 1/2011 | Manssen et al. | 455/121 |

* cited by examiner

*Primary Examiner* — Nguyen Vo

(57) ABSTRACT

Embodiments include systems and methods for controlling radiation of radio frequency (RF) energy by a wireless communication device that includes a transmitter, an antenna, a vector field sensor, and a processing system. The transmitter produces an analog RF signal, and the antenna radiates the analog RF signal into an environment. The vector field sensor senses an intensity of a vector field resulting from the analog RF signal radiated by at least the antenna (and possibly other portions of the device). The processing system determines whether a value representing the intensity is greater than a first threshold, and when the value is greater than the first threshold, the processing system causes the radiated RF energy produced by the wireless communication device to be decreased.

18 Claims, 7 Drawing Sheets

RADIATED POWER CONTROL SYSTEMS AND METHODS IN WIRELESS COMMUNICATION DEVICES

TECHNICAL FIELD

The inventive subject matter relates generally to wireless communications, and more particularly to methods and systems for controlling power radiated by a wireless communication device.

BACKGROUND

An antenna system of a wireless telephone (e.g., a cellular telephone) provides a means by which radio frequency (RF) energy may be radiated into the environment. Governmental agencies (e.g., the United States Federal Communications Commission (FCC)) impose limitations on the intensity of RF energy that a wireless telephone is permitted to radiate. For example, the FCC requires wireless telephone manufacturers to ensure that wireless telephones manufactured or imported for use in the United States do not radiate quantities of RF energy that exceed objective limits for human RF energy exposure, which limits have been deemed to be "safe" by the FCC. These limits are given in terms of a unit referred to as the Specific Absorption Rate (SAR), which is a measure of the amount of RF energy absorbed by the head of a wireless telephone user.

In addition to SAR requirements, the Hearing Aid Compatibility Act of 1988 (HAC Act) requires that the FCC ensure that wireless telephones are compatible with hearing aids and cochlear implants. The term "compatible," in this context, means that electric and magnetic fields produced by a wireless telephone have local intensities that will not cause appreciable interference with hearing aids or cochlear implants, as such interference may lead to audible noise. A wireless telephone may be considered to be compliant with HAC regulations when the maximum field strength within a measurement grid (referred to herein as the "HAC grid") is controlled to fall below specified limits. During the design and testing phase of a wireless telephone, the HAC grid is virtually transposed above and centered over the wireless telephone's earpiece speaker. The telephone is placed in a "free-space" condition, is activated to emit RF energy, and the electric and magnetic fields within the HAC grid are measured. When the measured electric and/or magnetic fields exceed HAC requirements, the device may be modified to reduce the emitted RF energy. HAC requirements tend to be more difficult to meet than SAR requirements. In other words, power control apparatus and algorithms that result in compliance with HAC requirements are highly likely also to result in compliance with SAR requirements. Accordingly, some wireless device manufacturers ensure compliance with both SAR and HAC requirements by controlling RF signal power and/or the efficiency of their antenna emissions so that the electric and magnetic fields do not exceed the specified limits within the HAC grid, along with verifying SAR compliance.

Compliance with HAC and SAR regulations are two important wireless device design considerations. However, these considerations tend to be in conflict with a common user desire, which is to maximize radiated RF energy (within safe limits) in order to have more reliable and higher quality communications. For example, during use of a wireless telephone, environmental conditions may decrease the radiation efficiency of the telephone, when compared with the radiation efficiency in a free-space condition. As a more specific example, the degree of contact between a wireless telephone and a user's body (e.g., the user's hand and head) may significantly and detrimentally affect the radiation efficiency of the wireless telephone. This may cause the telephone to produce electric and magnetic fields having intensities even further below HAC thresholds than intensities that may be produced during operation in a free-space condition. However, the reduced radiation efficiency also may decrease communications quality.

Although manufacturers readily design wireless telephones that comply with HAC and SAR regulations, current wireless telephone designs are not configured to optimize radiated RF power (within HAC and SAR limits) when environmental factors are present that may reduce radiation efficiency. Accordingly, what are needed are methods and apparatus for controlling the RF power radiated by a wireless telephone, which ensure compliance with prevailing regulations and which allow for increased RF power radiation under various environmental conditions. Other desirable features and characteristics of the present inventive subject matter will become apparent from the subsequent detailed description and the appended claims, taken in conjunction with the accompanying drawings and this background.

DETAILED DESCRIPTION

The following detailed description is merely exemplary in nature and is not intended to limit the inventive subject matter or the application and uses of the inventive subject matter.

Furthermore, there is no intention to be bound by any theory presented in the preceding background or the following detailed description.

As discussed previously, the United States Federal Communications Commission (FCC) imposes restrictions on manufacturers of wireless telephones. These restrictions include limits imposed on radio frequency (RF) emissions, and more specifically include limits on radiated RF power. Other governmental bodies may impose analogous restrictions on radiated RF power by a wireless telephone (or other wireless device), and/or wireless device manufacturers may self-impose their own limitations. Although the description, below, discusses RF power radiation control in the context of Specific Absorption Rate (SAR) or Hearing Aid Compatibility Act of 1988 (HAC Act) restrictions, it is to be understood that these particular regulations are discussed for example purposes, and are not meant to limit the scope of the embodiments to RF power radiation control based specifically on SAR and/or HAC regulations. Embodiments also may be used to control RF power radiation based on other regulations or limitations.

As discussed previously, during the testing of a wireless device design, vector field measurements associated with determining compliance of the device with HAC regulations are taken when the wireless device is in a free-space condition. However, the degree of contact between a wireless telephone and a user's body (e.g., the user's hand and head) may significantly and detrimentally affect the radiation efficiency of energy-radiating components of the telephone. Accordingly, an antenna that is tuned to radiate RF power at a level at or just below HAC compliant levels in a free-space condition will become detuned, and thus radiate significantly less RF power, when the wireless telephone is held in a user's hand and/or up against a user's head. Current methods of antenna tuning are driven by feedback data received from the device's RF system (e.g., measurements of load impedance, current, and/or forward power). Embodiments discussed below, however, utilize sensed and/or determined information regarding the actual vector fields produced as a result of the radiated RF power during "in the field" device operations. Based on that information, embodiments include adjusting various component values and/or transmit power parameters that affect the radiated RF power, in order to drive the radiated RF power toward, but not exceeding, pre-defined limits (e.g., limits associated with HAC and/or SAR regulations).

Figure 1:
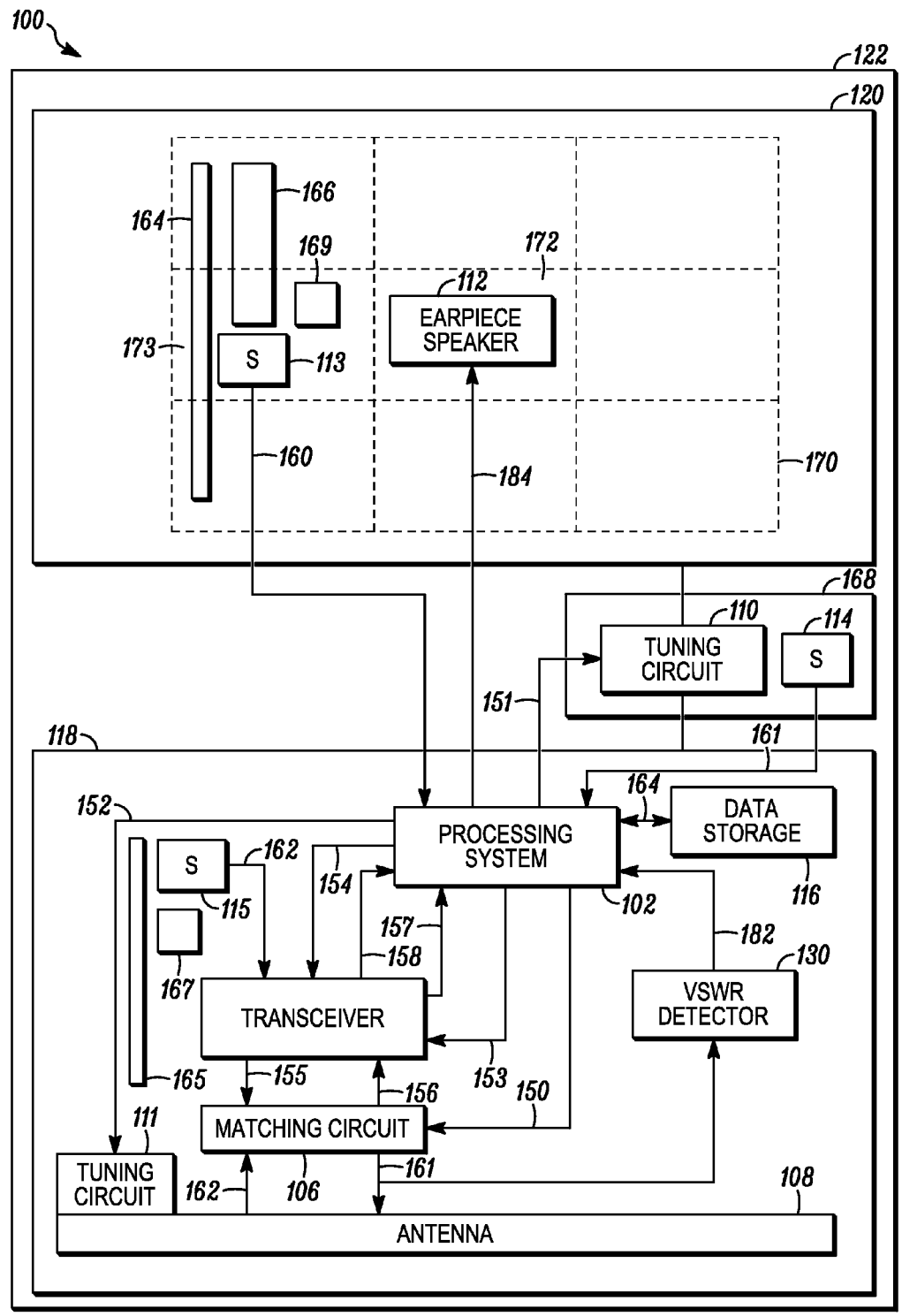
FIG. 1 illustrates a simplified block diagram of a wireless communication device within which adaptive radiated power control is implemented, in accordance with an example embodiment.

Embodiments include radiated RF power control methods and apparatus implemented in wireless communication devices. FIG. 1 illustrates a simplified block diagram of a wireless communication device 100 within which adaptive radiated power control is implemented, in accordance with an example embodiment. According to an embodiment, wireless device 100 is a wireless telephone that is configured to communicate with a terrestrial-based, satellite-based, airborne or vehicle-borne base station. This may include, for example, wireless device 100 transmitting signals to a base station and receiving signals from the base station. In other embodiments, wireless device 100 may wirelessly communicate with other types of remote devices (e.g., Bluetooth-compatible devices, relays, and so on).

Device 100 may be a wireless telephone (e.g., a cellular telephone), according to an embodiment, although device 100 may be some other type of wireless communication apparatus, in other embodiments. Although embodiments are discussed in detail that are incorporated in wireless telephones, it is to be understood that embodiments also may be implemented in other types of devices that emit RF energy (e.g., one-way or two-way radios, computers, personal data assistants (PDAs), pagers, wireless personal area network (WPAN) compatible devices, or other types of wireless communication apparatus). Accordingly, it is to be understood that embodiments are not limited only to wireless telephones.

According to an embodiment, device 100 includes a processing system 102, one or more transceivers 104, one or more matching circuits 106, one or more antennas 108, one or more tuning circuits 110, 111, an earpiece speaker 112, one or more vector field sensors 113, 114, 115, data storage 116, one or more ground planes 118, 120 (located on one or more printed circuit boards, not illustrated), and a housing 122, among other things. According to further embodiments, device 100 also may include a voltage standing wave ratio (VSWR) detector 130. Although FIG. 1 illustrates only a single transceiver 104, matching circuit 106, and antenna 108, it is to be understood that a device may include a plurality of any one or more of these components. In addition, although FIG. 1 illustrates two tuning circuits 110, 111 and two ground planes 118, 120, other devices may have only a single tuning circuit or ground plane or more than two tuning circuits or ground planes.

Device 100 may be, for example, a foldable type of wireless communication device. In such an embodiment, ground plane 118 may be located on a printed circuit board in the "base" of the telephone, and ground plane 120 may be located on a printed circuit board in the "cover" of the telephone. A hinge 168 enables the base and the cover to be rotated, with respect to each other, in order to open and close the telephone. In such a case, the housing 122 would include two portions: one associated with the base, and one associated with the cover. Alternatively, device 100 may be, for example, a slide type of wireless communication device, which has similarly separated ground planes 118, 120 and separate portions of housing 122. Rather than a hinge 168, however, a slide type of cellular telephone instead includes a slide mechanism, also indicated with reference numeral 168, to enables the base and cover of the telephone to be re-oriented, with respect to each other. In yet another embodiment, device 100 may be a "candy bar" type of wireless communication device. In such an embodiment, hinge or slide 168 may be excluded from the device 100. In addition, the device 100 may include a single ground plane (and a single printed circuit board), rather than multiple ground planes 118, 120. In such an embodiment, tuning circuit 110 and vector field sensor 114, discussed later, may be excluded from device 100.

Processing system 102 may include, for example, one or more general-purpose or special-purpose microprocessors, application specific integrated circuits (ASICs), digital-to-analog converters (DACs), analog-to-digital converters (ADCs), reference generators, clocks, and/or associated circuitry. According to an embodiment, processing system 102 is adapted, during operation, to control the functionality of matching circuit 106, tuning circuit 110, and/or tuning circuit 111 by determining one or more component values for one or more variable, impedance matching components of matching circuit 106, tuning circuit 110, and/or tuning circuit 111. Once the component values are determined, processing system 102 provides control signals 150, 151 to matching circuit 106, tuning circuit 110, and/or tuning circuit 111, which cause matching circuit 106, tuning circuit 110, and/or tuning circuit 111 to set the associated components to the indicated component values (e.g., to "tune" matching circuit 106, tuning circuit 110, and/or tuning circuit 111). According to an embodiment, processing system 102 also or additionally may determine power control parameters, and provide control signals 153 to transceiver 104, which may affect the output power of signals produced by transceiver 104 (e.g., by controlling the amplification applied by the transceiver's power amplifier, not illustrated). The component values and/or power control parameters may be computed by processing system 102, or the component values and/or power control parameters may be selected from pre-defined component values and/or power control parameters, which may be stored within data storage 116, for example.

As will be described in more detail below, determination of the component values and/or power control parameters is performed based on the intensity of one or more vector fields (e.g., electric and/or magnetic fields), as sensed at one or more points by vector field sensors 113-115 and/or as indicated by measurements made by transceiver 104. More particularly, the component values and/or power control parameters are determined so that, under environmental conditions that cause the radiated RF power to decrease (as indicated by information provided by vector field sensors 113-115 or transceiver 104), the device 100 may increase the radiated RF power toward, but not exceeding, pre-defined limits. These pre-defined limits may be related to HAC Act requirements, SAR requirements, or other requirements or limits. For example, current FCC HAC requirements stipulate that, for transmissions having frequencies below 1 gigahertz (GHz), the electric field is not to exceed 48.5 decibel volts per meter (dBV/m), and the magnetic field is not to exceed −1.9 decibel amps per meter (dBA/m), within a HAC measurement grid (e.g., HAC grid 170) that is virtually overlaid over a wireless telephone (e.g., device 100). For transmissions having frequencies above 1 GHz, the electric field is not to exceed 38.5 dBV/m, and the magnetic field is not to exceed −11.9 dBA/m. In addition to HAC requirements, FCC limits for human exposure from wireless telephones also are restricted to a SAR level of 1.6 watts per kilogram (1.6 W/kg). According to various embodiments, processing system 102 receives vector field information from vector field sensors 113-115 and/or transceiver 104, and based on the vector field information, determines component values and/or power control parameters so that the RF power radiated by device 100 does not produce vector fields that exceed the pre-defined HAC and/or SAR limits.

Vector field sensors 113-115 may include electric field sensors, magnetic field sensors, or both, according to various embodiments. At the physical location at which it is positioned, each vector field sensor 113-115 is configured to sense an electric field and/or a magnetic field corresponding to RF energy that is radiated by device 100. According to an embodiment, measurement signals 160, 161 that include information representing the sensed electric and/or magnetic fields are provided by vector field sensors 113, 114 to processing system 102. In such an embodiment, processing system 102 analyzes the measured signals and may adjust radiated RF energy, accordingly. According to another embodiment, measurement signals 162 that include information representing the sensed electric and/or magnetic fields are provided by vector field sensor 115 to transceiver 104. In such an embodiment, transceiver 104 may analyze the measured signals and may adjust radiated RF energy and/or provide signals 157 to processing system 102 to enable the processing system 102 to adjust radiated RF energy. Each of these embodiments will be discussed in more detail later.

For the purpose of simplicity of description, embodiments described in more detail herein will discuss vector field sensors 113-115 in the form of electric field sensors, and various determinations that may affect radiated RF power being made based on electric field measurements produced by such electric field sensors. It is to be understood, however, that embodiments also or alternatively may include magnetic field sensors, and various determinations that may affect radiated RF power may be made based on magnetic field measurements produced by magnetic field sensors. In addition, although FIG. 1 illustrates three vector field sensors 113-115, other devices may include as few as one vector field sensor, two vector field sensors, or more than three vector field sensors.

According to an embodiment, each vector field sensor 113-115 may include a probe (e.g., probe 402, FIG. 4, discussed later) that corresponds to an electric field probe or a magnetic field probe. For example, an electric field probe may include two conductive entities that are physically proximate to each other, but electrically insulated from each other across an air gap or a non-electrically conductive material (e.g., a dielectric). For example, the conductive entities included in a vector field sensor 113-115 corresponding to an electric field probe may include any two items selected from a group that includes a portion of a ground plane 118, 120, a transmission line 164, 165, a miscellaneous metallic component 166 (e.g., a battery, mechanical part, vibrator, and so on), a floating capacitor 167, a portion of a hinge or slide 168 (e.g., in a foldable phone or a slide type phone, respectively), a portion of housing 122, or another conductive entity. Alternatively, a magnetic field probe may include a looped conductive element 169. For example, a looped conductive element included in a vector field sensor 113, 115 corresponding to a magnetic field probe may include a conductor selected from a group that includes an inductor, a portion of a transformer, or another looped conductive element. According to still other embodiments, an antenna or antenna element (e.g., an auxiliary antenna such as a Bluetooth, Global Positioning System (GPS), diversity or other antenna), when not being used for other purposes, may be used to perform the function of one or more of vector field sensors 113-115. Accordingly, such an antenna element, at times may be considered a "vector field sensor" as that term is to be interpreted in the description and claims.

Vector field sensors 113-115 may be positioned in various physical locations within wireless device 100. For example, as shown in FIG. 1, vector field sensor 114 is positioned in proximity to hinge or slide 168, and vector field sensor 115 is positioned in proximity to ground plane 118 (e.g., in the base of a foldable or slide type phone, or on the lower half of a candy bar type phone). In contrast, vector field sensor 113 is positioned in proximity to ground plane 120 and earpiece speaker 112. More particularly, vector field sensor 113 is positioned in a portion of device 100 over which HAC grid 170 is transposed, according to an embodiment. Any of vector field sensors 113-115 may be electrically coupled to processing system 102 and/or transceiver 104, in various embodiments.

HAC grid 170 is used to define the maximum allowable field strength for FCC HAC conformance, and its positioning may vary from one device design to another. HAC grid 170 includes a three-by-three (3×3) array of measurement areas (e.g., squares), with a central measurement area 172 positioned above earpiece speaker 112 (e.g., about 1.5 centimeters (cm) above the highest surface of the device 100). According to an embodiment, vector field sensor 113 is not only positioned in a portion of device 100 over which HAC grid 170 is transposed, but is further positioned in a portion of device 100 over which a particular measurement area 173 of HAC grid 170 is located. The "particular" measurement area 173 corresponds to a measurement area within which a vector field intensity measurement taken during device testing was highest, when compared with intensity measurements taken during the device testing within measurement areas of the HAC grid 170 other than the particular measurement area 173. Accordingly, measurement area 173 may be referred to as a "highest intensity measurement area." Although FIG. 1 shows vector field sensor 113 being located within measurement area 173 (i.e., the left, central measurement area of HAC grid 170), a highest intensity measurement area may be a different measurement area, as well. In addition, in an alternate embodiment, a vector field sensor may be located in a measurement area other than the highest intensity measurement area. In still other embodiments, more than one vector field sensor may be located within a portion of the device over which HAC grid 170 is transposed. Locations of vector field sensors according to various embodiments will be described in more detail in conjunction with FIGS. 2 and 3, later.

Matching circuit 106 may include, for example but not by way of limitation, a matching network, a balun, an antenna tuner, a transmatch or an antenna tuning unit (ATU). Matching circuit 106 is coupled with antenna 108, and is adapted, during operation, to provide an input impedance to antenna 108, where the input impedance may be varied by adjusting the values of one or more passive or active impedance matching components (not illustrated in FIG. 1) of matching circuit 106. More particularly, matching circuit 106 includes one or more reactive components (e.g., capacitors, inductors, or other components), which have values that may be varied under the command or control of processing system 102 (via control signals 150). Matching circuit 106 also may include one or more transformers, switchable elements (e.g., transistors), and/or resistive components (e.g., resistors). According to an embodiment, the component values of matching circuit 106 are determined by processing system 102 so that the input impedance of matching circuit 106 closely matches the load impedance of antenna 108, in order to drive the radiated RF power toward, but not exceeding, pre-defined limits (e.g., limits associated with HAC and/or SAR regulations)

Tuning circuit 110 may include, for example but not by way of limitation, a tunable circuit that is located in proximity to or on the hinge or slide 168 of a foldable or slide type phone, respectively. Tuning circuit 110 is coupled between the first and second ground planes 118, 120, and is adapted, during operation, to produce a resonance between the ground planes 118, 120. The resonance may be produced by providing components that inductively and/or capacitively couple the ground planes 118, 120. One or more of the tuning circuit component values may be varied, according to an embodiment, in order to adjust the resonance between the ground planes 118, 120, resulting in an adjustment to the radiation efficiency of the ground planes 118, 120. More particularly, tuning circuit 110 includes one or more variable components (e.g., capacitors, inductors, or other components), which have values that may be varied under the command or control of processing system 102 (via control signals 151). According to an embodiment, the component values of tuning circuit 110 are determined by processing system 102 in order to drive the radiated RF power toward, but not exceeding, pre-defined limits (e.g., limits associated with HAC and/or SAR regulations).

Tuning circuit 111 may include, for example but not by way of limitation, a tunable circuit and a parasitic tuning element (not illustrated). Tuning circuit 111 is coupled with antenna 108, and is adapted, during operation, to drive the parasitic tuning element, thus affecting the frequency characteristics of antenna 108. One or more of the tuning circuit component values may be varied, according to an embodiment, in order to vary those frequency characteristics. More particularly, tuning circuit 111 includes one or more variable components (e.g., capacitors, inductors, or other components), which have values that may be varied under the command or control of processing system 102 (via control signals 152). According to an embodiment, the component values of tuning circuit 111 are determined by processing system 102 so that the frequency characteristics of antenna 108 are such that the radiated RF power is driven toward, but not exceeding, pre-defined limits (e.g., limits associated with HAC and/or SAR regulations).

Transceiver 104 is coupled between processing system 102 and matching circuit 106, and includes a transmitter and a receiver, according to an embodiment. In accordance with providing a transmit function, transceiver 104 receives baseband digital signals 154 from processing system 102, and the transmitter portion of transceiver 104 filters and processes the digital signals, converts the resulting digital signals to analog signals, and amplifies and upconverts the analog signals to produce a radio frequency (RF) analog signal 155 intended for transmission. In conjunction with the amplification process, the transmitter may include a power amplifier (not illustrated), whose amplification may be adjusted based on control signals 153 from processing system 102, according to an embodiment.

In accordance with providing a receive function, transceiver 104 receives RF analog signals 156, amplifies and downconverts the analog signals, converts the resulting analog signals to digital signals, and processes the digital signals to produce a baseband digital signal 158 that is ready for further processing by processing system 102. During the receive process, the receiver may determine a Received Signal Strength Indicator (RSSI) and/or another indication of the strength of a received signal. According to an embodiment, transceiver 104 may provide an information signal 157 that indicates the received signal strength (e.g., the RSSI) to processing system 102 during times that device 100 is transmitting a signal (rather than while device 100 is receiving a signal, as is typically done). Processing system 102 may use this information to estimate the radiated RF power, and may vary the component values of matching circuit 106, tuning circuit 110, and/or tuning circuit 111 and/or vary power control parameters associated with the transmitter of transceiver 104, in order to drive the radiated RF power toward, but not exceeding, pre-defined limits (e.g., limits associated with HAC and/or SAR regulations). In such an embodiment, processing system 102 may use indications of received signal strength, instead of or in addition to information provided by vector field sensors 113-115, in order to estimate or determine the radiated RF power of device 100.

As indicated above, processing system 102 may determine, based on information from vector field sensors 113-115 and/or transceiver 104, component values for matching circuit 106, tuning circuit 110, and/or tuning circuit 111, and the component values of each of these circuits 106, 110, 111 may affect the RF power that is radiated by device 100. In addition or alternatively, processing system 102 or transceiver 104 may determine, based on information from vector field sensors 113-115 and/or transceiver 104, power control parameters for the transmitter of transceiver 104 (or more particularly the transmitter's power amplifier), and these power control parameters also may affect the RF power that is radiated by device 100. According to one embodiment, processing system 102 may determine component values only for matching circuit 106, based on information from vector field sensors 113-115 and/or transceiver 104, in order to ensure HAC and/or SAR compliance. According to another embodiment, processing system 102 may determine component values only for tuning circuit 110, based on information from vector field sensors 113-115 and/or transceiver 104, in order to ensure HAC and/or SAR compliance. According to yet another embodiment, processing system 102 may determine component values only for tuning circuit 111, based on information from vector field sensors 113-115 and/or transceiver 104, in order to ensure HAC and/or SAR compliance. According to yet another embodiment, processing system 102 may determine only power control parameters, based on information from vector field sensors 113-115 and/or transceiver 104, in order to ensure HAC and/or SAR compliance. And according to still other embodiments, processing system 102 may determine power control parameters and/or component values for one, two or all three of matching circuit 106, tuning circuit 110 and/or tuning circuit 111, based on information from vector field sensors 113-115 and/or transceiver 104, in order to ensure HAC and/or SAR compliance.

Antenna 108 is coupled with matching circuit 106 and tuning circuit 111, and may include, for example, a single antenna element or a plurality of antenna elements. Upon receipt of an analog signal 161 from matching circuit 106, antenna 108 will radiate RF power corresponding to the analog signal into the environment. In addition, antenna 108 is adapted to detect RF power from the environment, and to provide corresponding analog signals 162 to matching circuit 106. According to an embodiment, antenna 108 is completely contained within housing 122, although antenna 108 may partially or completely extend outward from housing 122, in other embodiments. Along with antenna 108, housing 122 and ground planes 118, 120 may function to radiate RF power into the environment. Antenna 108 is illustrated in FIG. 1 as being positioned toward a bottom of housing 122. In other embodiments, antenna 108 may be positioned elsewhere within or extending from housing 122.

VSWR detector 130 is coupled between the output of matching circuit 106 and the input to antenna 108. VSWR detector 130 is adapted, during operation, to monitor actual forward and reflected RF power from the analog signals 161 at the input of antenna 108, in order to calculate a VSWR measurement 182, that VSWR detector 130 may provide to processing system 102. VSWR measurements 182 may be expressed using S-parameters (scattering parameters), for example. According to an embodiment, VSWR detector 130 includes a 4-port directional coupler, with a main line input and output ports being connected to the output of matching circuit 106 and the input to antenna 108, respectively. Both coupled ports of the coupler are connected to corresponding RF power sensors, which provide data about measured forward and reflected RF power levels. As will be described in more detail later, VSWR measurements 182 may be evaluated by processing system 102 during its determination of component values and/or power control parameters.

Data storage 116 may include, for example, one or more data storage devices that are separate from or integral with processing system 102. Data 164 may be stored by processing system 102 within data storage 116, or retrieved by processing system 102 from data storage 116. For example, data storage 116 may include a combination of various types of non-volatile and volatile read only memory (ROM) and random access memory (RAM). According to an embodiment, data storage 116 is adapted to store information that enables processing system 102 to evaluate information produced by vector field sensors 113-115 and/or transceiver 104. For example, this information may include one or more thresholds and a HAC reading comparison table, as will be discussed in more detail later. According to another embodiment, data storage 116 also may be adapted to store pre-defined component values for at least those impedance matching components of matching circuit 106, tuning circuit 110, and/or tuning circuit 111 that are variable.

Figure 2:
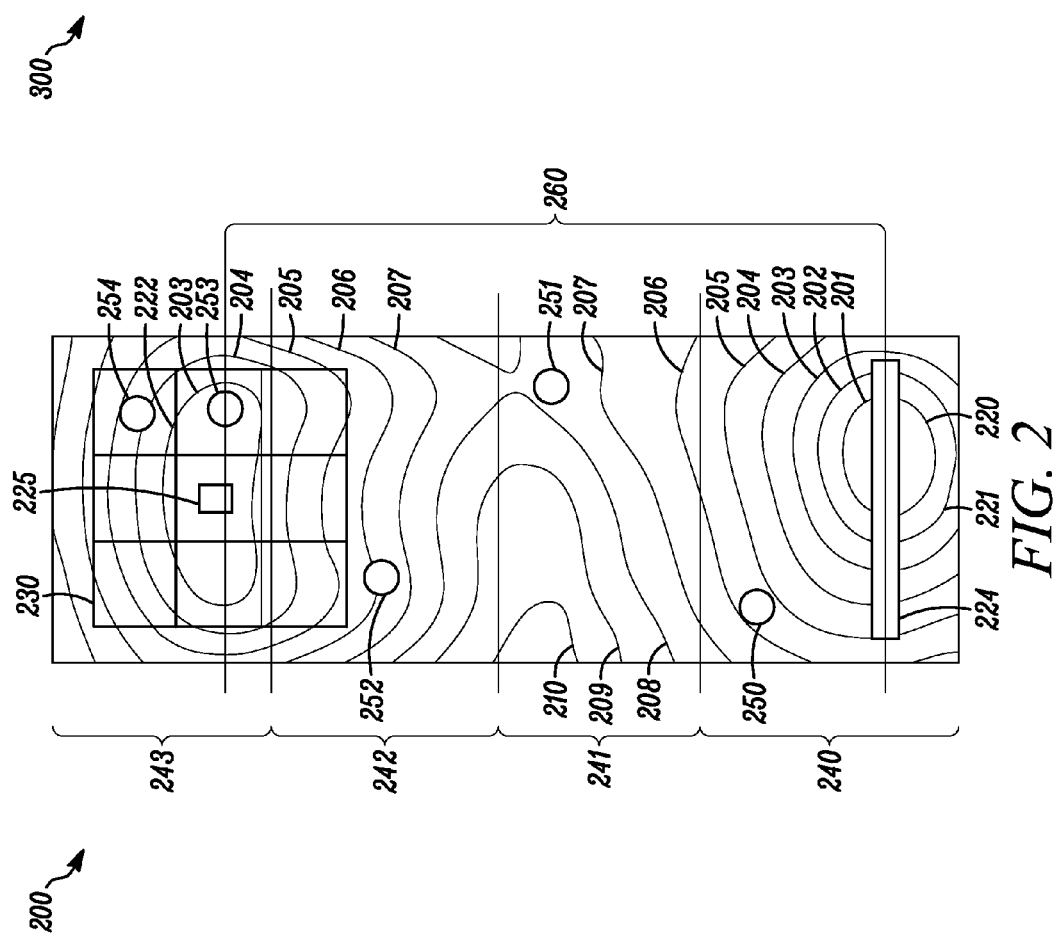
FIG. 2 illustrates various possible sensor locations transposed on an example of an electric field contour plot associated with lowband transmissions, in accordance with an example embodiment.

As FIG. 1 indicates, vector field sensors 113-115 may be located in various positions within housing 122 or on the surface of housing 122. FIG. 2 illustrates various possible sensor locations transposed on an example of an electric field contour plot 200 associated with lowband transmissions, in accordance with an example embodiment. Plot 200 depicts varying intensities of an electric field measured approximately 15 mm above the front surface of a wireless communication device (e.g., device 100, FIG. 1) at a time when the device is radiating RF energy associated with a wireless signal transmission at a lowband frequency. For purposes of example, the term "lowband" means frequencies in a range of about 800-900 MHz.

Each of contour lines 201-210 represents a continuum of points at which a particular electric field intensity is measured. For example, contour line 201, which borders region 220, may represent points at which an electric field intensity of about 51 dBV/m is measured. Accordingly, the measured electric field intensities within region 220 would be 51 dBV/m or higher. Similarly, contour line 202 may represent points at which an electric field intensity of about 50 dBV/m was measured, and region 221 (between contour lines 220 and 221) would correspond to measured electric field intensities between 50 and 51 dBV/m. As a final example, contour lines 203 may represent points at which an electric field intensity of about 48.6 dBV/m is measured. One of contour lines 203 borders region 222.

The wireless device that was used to produce the RF radiation associated with plot 200 includes a primary antenna (e.g., antenna 108, FIG. 1) toward the bottom of the device housing (or in the base of a foldable or slide type of telephone), as depicted by rectangle 224 (in proximity to region 220). The earpiece speaker (e.g., earpiece speaker 112, FIG. 1) is located toward the top of the device housing (or in the cover of a foldable or slide type of telephone), as depicted by square 225. A HAC grid 230 is shown transposed over plot 200, and the location 225 of the earpiece speaker is below and within the central measurement area of HAC grid 230. Plot 200 is shown divided into four quarters 240, 241, 243, 244. The highest electric field intensity above the surface of the device corresponds to region 220, which occurs within the bottom quarter 240 of plot 200, where the antenna is located. Proceeding upward from the location of the antenna, the electric field intensity first decreases, and then increases again to another region of relatively high intensity, which is region 222. Region 222 occurs within HAC grid 230 and within the top quarter 244 of the device.

As discussed previously in conjunction with FIG. 1, embodiments include sensing (e.g., by one or more of sensors 113-115, FIG. 1) a vector field resulting from radiation of RF energy, and setting power control parameters and/or the values of one or more variable components in order to ensure that the vector field does not exceed pre-defined limits. As plot 200 indicates, the intensity of a vector field may vary significantly over the surface of a device, and accordingly a measured reading of vector field intensity depends on the location of a vector field sensor. Circles 250, 251, 252, 253, 254 indicate five example locations of vector field sensors. Circle 250 is present within the bottom quarter 240 of plot 200, and corresponds to a sensor location in the bottom quarter of a device's housing (e.g., in the base of a foldable or slide type phone). Circle 251 is present within the second-to-bottom quarter 241 of plot 200, and corresponds to a sensor location in the second-to-bottom quarter of the device's housing (e.g., also in the base of a foldable or slide type phone). Circle 252 is present within the second-to-top quarter 242 of plot 200, and corresponds to a sensor location in the second-to-top quarter of the device's housing (e.g., in the cover of a foldable or slide type phone). Finally, circles 253, 254 are present within the top quarter 244 of plot 200, and correspond to sensor locations in the top quarter of the device's housing (e.g., also in the cover of a foldable or slide type phone). Circles 253, 254 also coincide with HAC grid 230. Circle 253 more particularly coincides with the highest intensity region 222 within the top half of plot 200 and within the HAC grid 230.

According to an embodiment, at least one vector field sensor is located in a portion of a device over which a HAC grid is transposed (e.g., in portions of the device corresponding to circles 253, 254). According to a further embodiment, at least one vector field sensor is located in a portion of a device corresponding to a highest intensity region (e.g., region 222) within a HAC grid transposed over the device (e.g., over circle 253). The portion of the device corresponding to the highest intensity region 222 within the HAC grid 230 may be determined during device design, for example. According to yet another embodiment, a distance (e.g., distance 260) of at least one vector field sensor from the antenna is at least one half the length (i.e., the longest dimension) of the device, although the distance may be shorter, as well. In the case of a foldable or slide type of device, this would be the length when the device is in an open (i.e., unfolded) or extended position.

Figure 3:
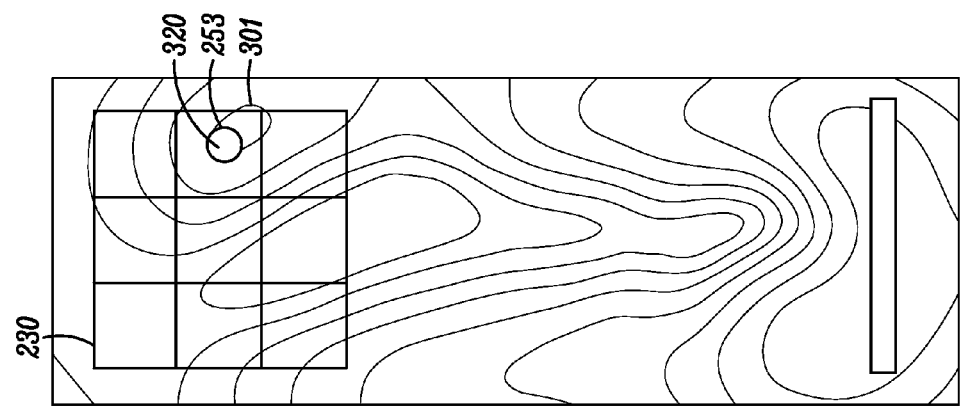
FIG. 3 illustrates various possible sensor locations transposed on an example of an electric field contour plot associated with highband transmissions, in accordance with an example embodiment.

FIG. 3 illustrates various possible sensor locations transposed on an example of an electric field contour plot 300 associated with highband transmissions, in accordance with an example embodiment. Once again, plot 300 depicts varying intensities of an electric field measured approximately 15 mm above the front surface of the same wireless communication device as in FIG. 2 at a time when the device is radiating RF energy associated with a wireless signal transmission at a highband frequency. For purposes of example, the term "highband" means frequencies in a range of about 1800-1900 MHz. A comparison of plots 200 (FIG. 2) and 300 (FIG. 3) shows that a particular wireless device may produce significantly differently contoured electric fields for transmissions in different frequency bands. More particularly, for example, contour line 301, which borders region 320, may represent points at which an electric field intensity of about 37 dBV/m is measured. Within HAC grid 230, region 320 represents a region of highest intensity for highband transmissions. Once again, circle 253 (which is also present in FIG. 2) coincides with the highest intensity region 320 within the top half of plot 300 and within the HAC grid 230. According to an embodiment, at least one vector field sensor is located in a portion of a device corresponding to highest intensity regions (e.g., regions 222, 320) for multiple frequency bands, which occur within a HAC grid transposed over the device (e.g., over circle 253). Again, the portion of the device corresponding to the highest intensity regions 222, 320 within the HAC grid 230 may be determined during device design. As discussed previously, vector field sensors also or alternatively may be located in portions of the device corresponding to lower intensity regions, within or outside of the HAC grid, according to various embodiments.

The contour plots 200, 300 of FIGS. 2 and 3 are given for example purposes only, in order to facilitate descriptions of various embodiments. It is to be understood that various wireless devices may produce electric fields having similar or significantly different contour plots. In addition, although contour plots were produced for transmissions at frequencies between 800-900 MHz and 1800-1900 MHz, respectively, it is to be understood that embodiments may be implemented in devices that transmit at higher, lower, and/or intermediate frequencies, as well.

Figure 4:
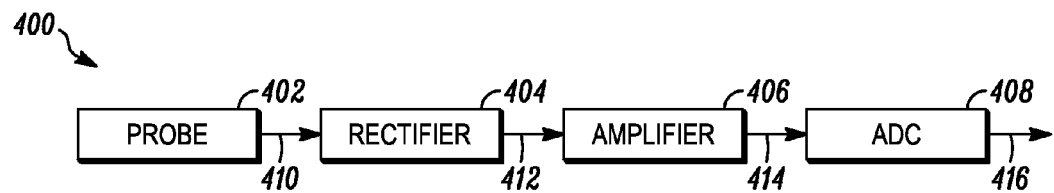
FIG. 4 illustrates an example of a vector field sensor, in accordance with an example embodiment.

FIGS. 4-7 illustrate various types of vector field sensors (e.g., vector field sensors 113-115, FIG. 1) and other transceiver apparatus that may be used to sense vector fields and/or to produce an indication of a vector field intensity. More particularly, FIG. 4 illustrates an example of a vector field sensor 400, in accordance with an example embodiment. Vector field sensor 400 includes at least a probe 402 and a rectifier 404, according to an embodiment. Probe 402 may include any apparatus that is configured to produce an analog indication of a vector field intensity 410 (e.g., an electric or magnetic field). The analog indication 410 may be a voltage, a current, or a capacitive charge, for example. As discussed previously, for example, probe 402 may correspond to an electric field probe, and thus may include two conductive entities of a device that are physically proximate to each other, but electrically insulated from each other across an air gap or a non-electrically conductive material (e.g., any two of ground planes 118, 120, transmission lines 164, 165, a miscellaneous metallic component 166, a floating capacitor 167, a portion of a hinge or slide 168, a portion of housing 122, or another conductive entity of device 100, FIG. 1). Alternatively, probe 402 may correspond to a magnetic field probe, and thus may include a looped conductive element (e.g., looped conductive element 169, FIG. 1, which may be an inductor, a portion of a transformer, or another looped conductive element).

Rectifier 404 may include, for example, a diode detector or another type of rectifier. Rectifier 404 is configured to receive the analog indication of the vector field intensity 410, and to rectify the received analog indication in order to produce an analog, rectified vector field intensity indication 412. According to an embodiment, this indication 412 may be provided to a processing system (e.g., processing system 102, FIG. 1) for analysis. According to another embodiment, vector field sensor 400 may also include an amplifier 406, which is configured to amplify the rectified vector field intensity indication 412 in order to produce an analog, amplified vector field intensity indication 414. The amplified vector field intensity indication 414 may thereafter be provided to the processing system (instead of rectified vector field intensity indication 412). Amplifier 406 may be excluded, however, in embodiments in which amplification is not important to signal analysis. According to a further embodiment, vector field sensor 400 also may include an analog-to-digital converter 408 (ADC), which is configured to convert the amplified vector field intensity indication 414 (or the rectified vector field intensity indication 412) into a digital vector field intensity indication 416. In such an embodiment, the digital vector field intensity indication 416 may be provided to the processing system for analysis.

Figure 5:
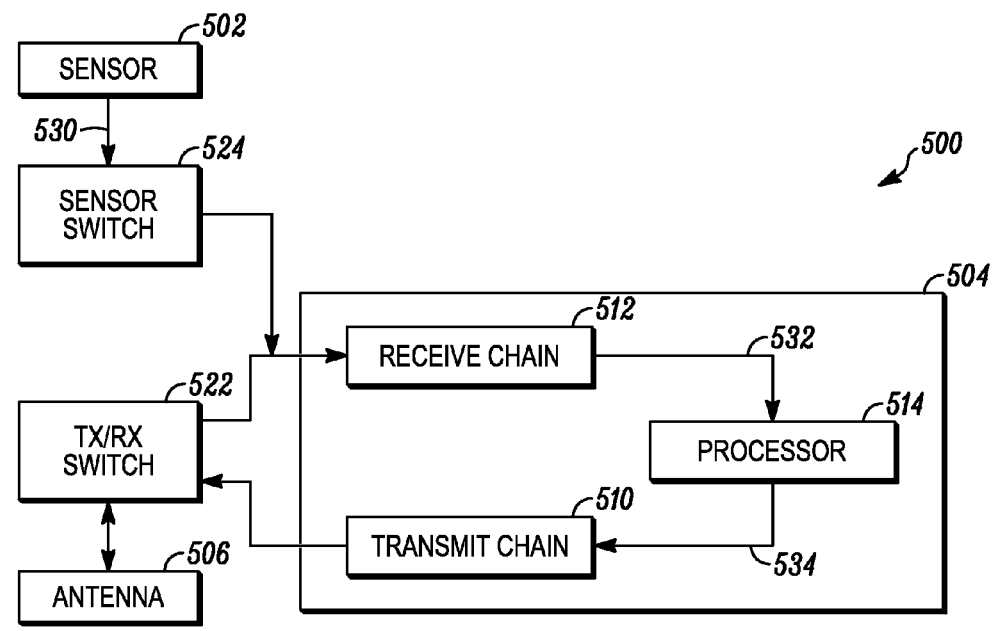
FIG. 5 illustrates an example of a configuration of a portion of a device that includes a vector field sensor and a transceiver, in accordance with another example embodiment.

FIG. 5 illustrates an example of a configuration of a portion of a device 500 that includes a vector field sensor 502 and a transceiver 504, which together are adapted to generate a vector field intensity indication, in accordance with another example embodiment. Device 500 includes vector field sensor 502, transceiver 504, and antenna 506. Transceiver 504 includes a transmit chain 510, a receive chain 512, and a processor 514. Transceiver 504 may be, for example, a transceiver configured to communicate using a GSM (Global System for Mobile communications) communication protocol, according to an embodiment. A typical GSM protocol implements Time Division Multiplexing (TDM), which involves alternatively configuring the device in a transmit mode or a receive mode. While in the receive mode, the receive chain 512 is interconnected with antenna 506 through a transmit (TX)/receive (RX) switch 522. Conversely, while in the transmit mode, the transmit chain 510 is interconnected with antenna 506 through TX/RX switch 522. The receive chain 512 essentially is idle during times that device 500 is in the transmit mode.

According to an embodiment, portions of receive chain 512 are utilized while device 500 is in the transmit mode to determine an indication of a vector field intensity associated with the device's RF transmissions. More particularly, during at least part of the time that the TX/RX switch 522 is configured to interconnect transmit chain 510 with antenna 506, a sensor switch 524 is configured to provide an analog vector field intensity indication 530 produced by vector field sensor 502 to the receive chain 512. Vector field sensor 502 may include an electric field sensor and/or a magnetic field sensor. For example, vector field sensor 502 may include a probe (e.g., probe 402, FIG. 4) and a rectifier (e.g., rectifier 404, FIG. 4). Vector field sensor 502 also may include an attenuator (not illustrated) or an amplifier (e.g., amplifier 406, FIG. 4), in various embodiments.

Receive chain 512 receives the vector field intensity indication 530. According to an embodiment, receive chain 512 may process the received vector field intensity indication 530 in order to produce a Received Signal Strength Indicator (RSSI) 532 and/or another indication of the strength of the vector field intensity indication 530. Processor 514 may include a baseband processor, and may form a portion of a larger processing system (e.g., processing system 102, FIG. 1). According to an embodiment, processor 514 analyzes the RSSI 532 to determine a relationship between the vector fields from the device's transmissions and pre-defined limits on RF radiation (e.g., HAC and/or SAR limits). As will be described in more detail in conjunction with FIG. 8, based on the relationship between the measured vector fields and the pre-defined limits, processor 514 (or processing system 102, FIG. 1) may produce control signals (e.g., signals 534 and/or signals 150-153, FIG. 1) that cause adjustments in the component values within tunable circuits (e.g., circuits 106, 110, 111, FIG. 1) and/or that cause adjustments in the amplification produced by the transmit chain 510. Each of these adjustments may affect the level of RF power radiated by the device. According to an embodiment, the adjustments are made in order to drive the radiated RF power toward, but not exceeding, the pre-defined limits (e.g., limits associated with HAC and/or SAR regulations).

Figure 6:
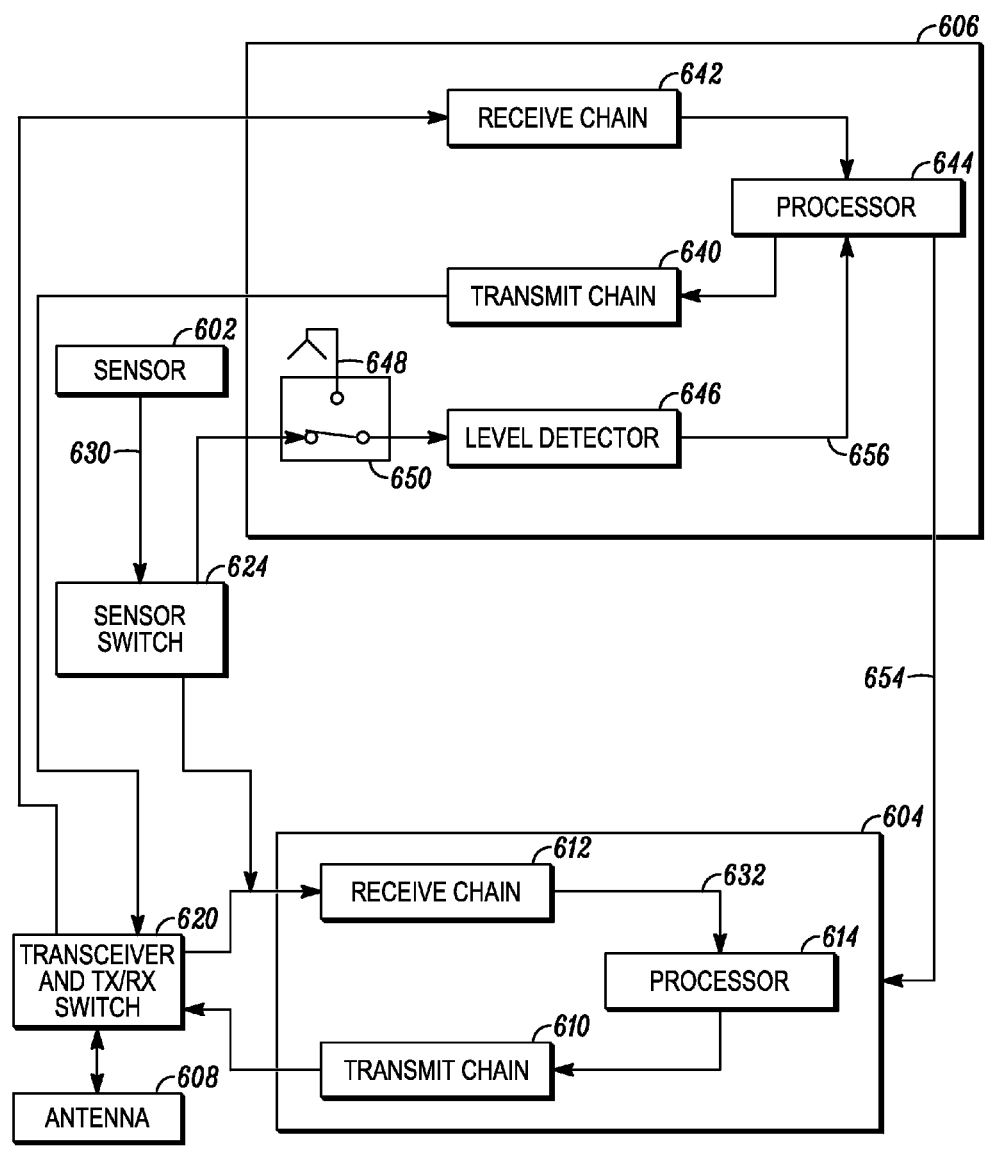
FIG. 6 illustrates an example of a configuration of a portion of a device that includes a vector field sensor and multiple transceivers, in accordance with another example embodiment.

FIG. 6 illustrates an example of a configuration of a portion of a device 600 that includes a vector field sensor 602 and multiple transceivers 604, 606, which together are adapted to generate a vector field intensity indication, in accordance with another example embodiment. Transceiver 604 may be, for example, a transceiver configured to communicate using a GSM communication protocol, and transceiver 606 may be a transceiver configured to communicate using a Wideband Code Division Multiple Access (WCDMA) protocol, according to an embodiment. Either transceiver 604, 606 may be activated to transmit and receive RF signals. However, only one transceiver 604, 606 would be activated at any given time. Accordingly, one transceiver may be idle while the other transceiver is activated. According to an embodiment, portions of one transceiver 604 or 606 are utilized to determine an indication of a vector field intensity while the other transceiver 606 or 604 is producing RF transmissions. Transceiver and TX/RX switch 620 may be configured either to connect the receive chain 612 of transceiver 604 to antenna 608, to connect the transmit chain 610 of transceiver 604 to antenna 608, or to connect transceiver 606 to antenna 608, at any given time. When transceiver 606 is activated, it is connected with antenna 608 through transceiver and TX/RX switch 620. Conversely, when transceiver 604 is activated, either transmit chain 610 or receive chain 612 is connected with antenna 608 through transceiver and TX/RX switch 620.

As mentioned above, transceiver 606 may communicate using a WCDMA protocol. Unlike communications using a GSM protocol, communications using a WCDMA protocol may involve simultaneous transmission and receipt of RF signals (at different carrier frequencies). Transceiver 606 includes a transmit chain 640, a receive chain 642, and a processor 644. In addition, transceiver 606 may include a level detector 646, which may or may not form a portion of the transmit chain 640. During normal operations, level detector 646 is adapted to determine the power level of transmitted signals originating from transmit chain 640 by sensing the transmit power level using a coupler 648. Level detector 646 provides signals 656 indicating the transmit power level to processor 644, which may use the information to adjust the amplification performed by the power amplifier of transmit chain 640. According to an embodiment, when transceiver 606 is inactive and/or when transceiver 604 is active (and transmitting an RF signal), sensor switch 624 and level detector switch 650 may be configured to provide an analog vector field intensity indication 630 produced by vector field sensor 602 to the level detector 646. Level detector 646 may process the received vector field intensity indication 630 in order to produce an indication of the power level of transmitted signals originating from transmit chain 610 of transceiver 604. Once again, level detector 646 provides signals 656 indicating the transmit power level to processor 644.

Processor 644 may include a baseband processor, and may form a portion of a larger processing system (e.g., processing system 102, FIG. 1). According to an embodiment, processor 644 analyzes the signals 656 from level detector 646 to determine a relationship between the vector fields from the device's transmissions and pre-defined limits on RF radiation (e.g., HAC and/or SAR limits). As will be described in more detail in conjunction with FIG. 8, based on the relationship between the measured vector fields and the pre-defined limits, processor 644 (or processing system 102, FIG. 1) may produce control signals (e.g., signals 654 or signals 150-153, FIG. 1) that cause adjustments in the component values within tunable circuits (e.g., circuits 106, 110, 111, FIG. 1) and/or that cause adjustments in the amplification produced by the transmit chain 610 of transceiver 604. Each of these adjustments may affect the level of RF power radiated by the device. According to an embodiment, the adjustments are made in order to drive the radiated RF power toward, but not exceeding, the pre-defined limits (e.g., limits associated with HAC and/or SAR regulations).

Operation of a GSM type of transceiver (e.g., transceiver 604) was discussed previously in conjunction with FIG. 5. Similar to the previously discussed operation, while transceiver 604 is activated and is in the receive mode, the receive chain 612 of transceiver 604 is interconnected with antenna 608 through a transceiver and TX/RX switch 620. Conversely, while in the transmit mode, the transmit chain 610 of transceiver 604 is interconnected with antenna 608 through transceiver and TX/RX switch 620. According to an embodiment, portions of receive chain 612 may be utilized while transceiver 604 is activated and is in the transmit mode to determine an indication of a vector field intensity associated with the device's RF transmissions. More particularly, during at least part of the time that the transceiver and TX/RX switch 620 is configured to interconnect transmit chain 610 with antenna 608, sensor switch 624 is configured to provide the analog vector field intensity indication 630 produced by vector field sensor 602 to the receive chain 612, as discussed previously. Receive chain 612 may process the received vector field intensity indication 630 in order to produce an RSSI 632 and/or another indication of the strength of the vector field intensity indication 630, as also discussed previously. According to another embodiment, receive chain 612 may be utilized to produce an RSSI 632 or other indication while the other transceiver (i.e., transceiver 606) is activated and is transmitting RF energy. In other words, receive chain 612 may be utilized when transceiver 604 is considered inactive (i.e., the transmit chain 610 is not being used to transmit RF signals).

The example embodiment described in conjunction with FIG. 6 includes transceiver 606, which is adapted to communicate using a GSM communications protocol, and transceiver 604, which is adapted to communicate using a WCDMA communications protocol. Other embodiments may include one or more additional or different transceivers that are adapted to communicate using one or more other types of standards-based and/or proprietary communications protocols (e.g., any second generation (2G), third generation (3G), fourth generation (4G), and/or other communications protocol or standard defined by the International Telecommunication Union). Regardless of the types of transceivers implemented, embodiments include using resources (e.g., hardware, firmware, software) of a transmitter of a first transceiver within a device to transmit an RF signal, while simultaneously using resources of a receiver of a second transceiver within the device to determine information (e.g., an RSSI or other information) that is related to the vector field intensity of the transmissions.

Figure 7:
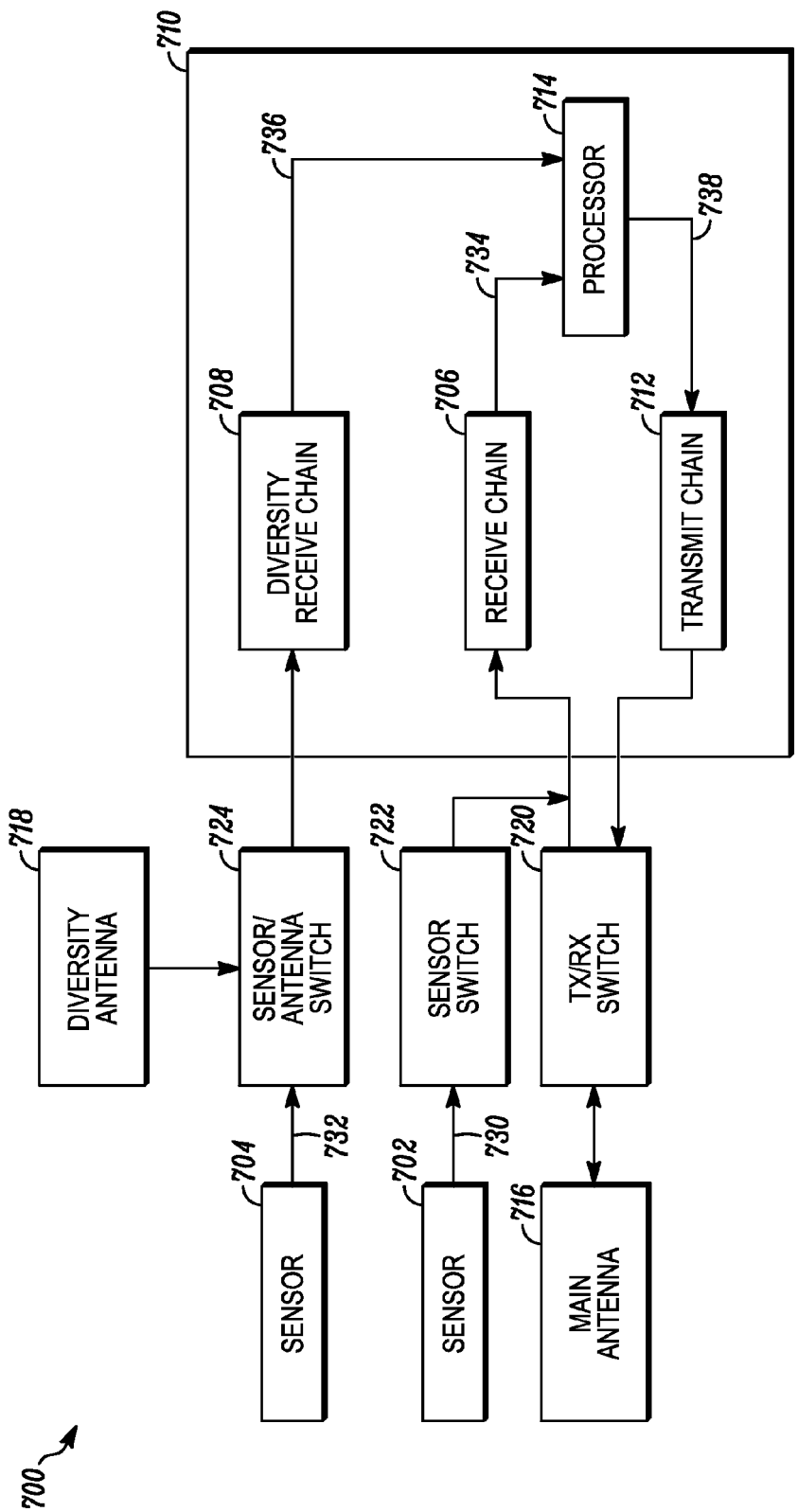
FIG. 7 illustrates an example of a configuration of a portion of a device that includes multiple vector field sensors and multiple receive chains, in accordance with another example embodiment.

FIG. 7 illustrates an example of a configuration of a portion of a device 700 that includes multiple vector field sensors 702, 704 and multiple receive chains 706, 708, which together are adapted to generate a vector field intensity indication, in accordance with another example embodiment. Device 700 includes multiple vector field sensors 702, 704, transceiver 710, and multiple antennas 716, 718. Transceiver 710 is configured to implement receive and/or transmit diversity, and accordingly includes one or more transmit chains 712, multiple receive chains 706, 708, and a processor 714, according to an embodiment. Transceiver 710 may be configured to implement a GSM communications protocol, and the description below discusses such an implementation in detail. It is to be understood, however, that embodiments may include other types of transceivers (e.g., transceivers that implement other communications protocols) that are configured to implement receive and/or transmit diversity, and such embodiments are intended to be included in the scope of the inventive subject matter.

As discussed in conjunction with FIG. 5, a typical GSM protocol implements TDM, which involves alternatively configuring the device in a transmit mode or a receive mode. Accordingly, while device 700 is in a receive mode during which device 700 is receiving an RF signal from a remote device (e.g., a base station or another device), a primary receive function includes configuring TX/RX switch 720 to connect main antenna 716 to receive chain 706, detecting the RF signal using main antenna 716, and processing the signal using receive chain 706 and processor 714. In addition, and according to an embodiment, a diversity receive function includes configuring sensor/antenna switch 724 to connect diversity antenna 718 to diversity receive chain 708, redundantly detecting the RF signal using diversity antenna 718, and processing the redundantly detected signal using diversity receive chain 708 and processor 714. Details regarding redundant processing in conjunction with receive diversity will not be discussed herein, as such processing techniques are known to those of skill in the art. According to another embodiment, transceiver 710 also may be configured to implement transmit diversity, as well. However, a detailed discussion of transmit diversity is outside the scope of this description.

While device 700 is in the transmit mode, receive chain 706 and diversity receive chain 708 essentially are idle. According to an embodiment, portions of receive chains 706, 708 are utilized while device 700 is in the transmit mode to determine an indication of a vector field intensity associated with the device's RF transmissions. More particularly, during at least part of the time that the TX/RX switch 720 is configured to interconnect transmit chain 712 with main antenna 716, sensor switch 722 is configured to provide a first analog vector field intensity indication 730 produced by a first vector field sensor 702 to the receive chain 706. In order to provide additional information that may improve accuracy, sensor/antenna switch 724 simultaneously may be configured to provide a second analog vector field intensity indication 732 produced by a second vector field sensor 704 to diversity receive chain 708. According to an alternate embodiment, device 700 may be configured to provide only second analog vector field intensity indication 732 to diversity receive chain 708, without providing the first analog vector field intensity indication 730 to receive chain 706. For example, when device 700 is not in an operational mode in which receive diversity is being implemented, sensor/antenna switch 724 may be configured to provide analog vector field intensity indication 732 produced by vector field sensor 704 to diversity receive chain 708, and provision of vector field intensity indication 730 may be excluded.

Vector field sensors 702, 704 may include electric field sensors and/or magnetic field sensors. For example, vector field sensors 702, 704 may include probes (e.g., probe 402, FIG. 4) and rectifiers (e.g., rectifier 404, FIG. 4). Vector field sensors 702, 704 also may include attenuators (not illustrated) or amplifiers (e.g., amplifier 406, FIG. 4), in various embodiments.

According to an embodiment, receive chains 706, 708 may process the received vector field intensity indications 730, 732 in order to produce RSSIs 734, 736 and/or other indications of the strength of the vector field intensity indications 730, 732. Processor 714 may include a baseband processor, and may form a portion of a larger processing system (e.g., processing system 102, FIG. 1). According to an embodiment, processor 714 analyzes either or both RSSIs 734, 736 to determine a relationship between the vector fields from the device's transmissions and pre-defined limits on RF radiation (e.g., HAC and/or SAR limits). When both first and second RSSIs 734, 736 are received, processor 714 may, for example, use the larger of the received RSSIs 734, 736 during its analysis, and/or may use a combination of the received RSSIs 734, 736 during its analysis (e.g., an average or some other mathematical combination of the RSSIs 734, 736). When only a single RSSI (e.g., either RSSI 734 or 736) is received, processor 714 may use the single RSSI during its analysis, according to an alternate embodiment.

As will be described in more detail in conjunction with FIG. 8, based on the relationship between the measured vector fields and the pre-defined limits, processor 714 (or processing system 102, FIG. 1) may produce control signals (e.g., signals 738 and/or signals 150-153, FIG. 1) that cause adjustments in the component values within tunable circuits (e.g., circuits 106, 110, 111, FIG. 1) and/or that cause adjustments in the amplification produced by the transmit chain 712. Each of these adjustments may affect the level of RF power radiated by the device. According to an embodiment, the adjustments are made in order to drive the radiated RF power toward, but not exceeding, the pre-defined limits (e.g., limits associated with HAC and/or SAR regulations).

Figure 8:
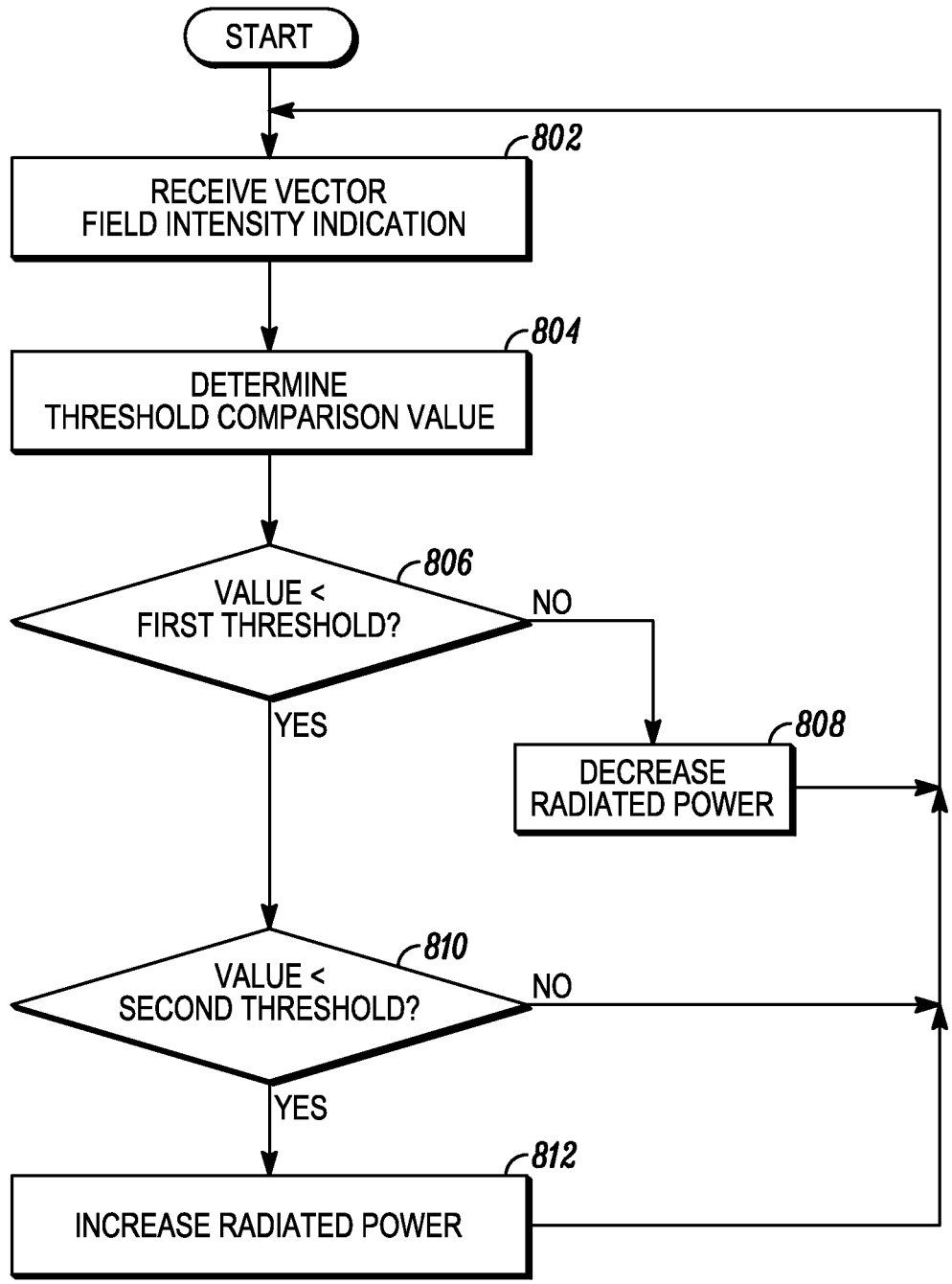
FIG. 8 illustrates a flowchart of a method for performing radiated power control based on sensed information, in accordance with an example embodiment.

FIG. 8 illustrates a flowchart of a method for performing radiated power control based on sensed information, in accordance with an example embodiment. According to an embodiment, the method may be performed within the context of a "call," where a "call" refers to any type of communication session in which a wireless device transmits RF signals (e.g., a voice communication session or a data communication session) to a base station or to another device. The method may run continuously for a duration of the call, or may be executed periodically, aperiodically or in response to a triggering event.

Embodiments of the method may be performed by a processing system (e.g., processing system 102, FIG. 1) in conjunction with one or more vector field sensors (e.g., sensors 113-115, 400, 502, 604, 702, 704, FIGS. 1 and 4-7), tunable circuits (e.g., matching circuit 106, tuning circuit 110, and/or tuning circuit 111, FIG. 1), transceivers (e.g., transceivers 102, 504, 604, 606, 710, FIGS. 1 and 5-7), and various other system elements. For enhanced understanding, an example embodiment will be discussed in which electric fields are sensed by vector field sensors, and the corresponding sensed values are analyzed to determine whether the sensed values indicate compliance with HAC Act regulations. For purposes of example, assume that the transmission frequency is below 1 GHz. Accordingly, current, relevant HAC Act regulations stipulate that the electric field is not to exceed 48.5 dBV/m. It is to be understood that the above example, which will be used throughout the description of FIG. 8, is not to be construed as limiting. Instead, modifications to the below described embodiment may be made to ensure compliance with other HAC Act regulations (e.g., regulations relating to magnetic fields, regulations associated with different transmission frequencies, and/or future-defined regulations), SAR regulations, other regulations stipulated by governmental entities, and/or limitations on RF emissions that are voluntarily implemented by device manufacturers. Thus, the below discussion relating to sensing electric fields and comparing values to specific HAC related values is not intended to be limiting, but is provided for example and explanation purposes only.

According to an embodiment, the method may begin, in block 802, when the processing system receives one or more vector field intensity indications. The term "vector field intensity indication," as used herein, means any type of indication of an electric field or a magnetic field that is produced by components incorporated into a device (as opposed to external test equipment). For example, a vector field intensity indication may be an analog or digital representation of a sensed vector field produced by a vector field sensor (e.g., sensors 113-115, 400, 502, 604, 702, 704, FIGS. 1 and 4-7). For example, but not by way of limitation, the analog or digital representation of a sensed vector field produced by a vector field sensor may be an analog or digital representation of a voltage, current or charge, according to various embodiments. Alternatively, a vector field intensity indication may be a processed (e.g., amplified, attenuated, filtered, and/or analyzed) version of an analog or digital representation of a sensed vector field produced by a vector field sensor. For example, as discussed previously, a vector field intensity indication may be an RSSI or other indicator of the strength of a signal that is transmitted by the device, as determined by a receive chain (e.g., receive chains 512, 612, 706, 708, FIGS. 5-7) or other component (e.g., level detector 646, FIG. 6) within a transceiver (e.g., transceivers 504, 604, 606, 710, FIGS. 5-7).

In block 804, the vector field intensity indication(s) are analyzed to determine a threshold comparison value. According to an embodiment, the threshold comparison value may be equal to a single received vector field intensity indication. For example, when the vector field intensity indication includes a voltage value received from an electric field sensor, the threshold comparison value may equal the voltage value. Alternatively, the vector field intensity indication and the threshold comparison value may be in the units of current, charge, power, RSSI or some other measurable quantity, in various embodiments.

In other embodiments, the threshold comparison value may be different from the vector field intensity indication (e.g., it may be in different units), or may be calculated based on multiple received vector field intensity indications. For example, when multiple vector field intensity indications are received (e.g., vector field intensity indications 730, 732, FIG. 7), the threshold comparison value may be calculated based on a mathematical relationship between the received vector field intensity indications (e.g., a maximum received value, an average, or some other relationship). As yet another example, when one or more RSSIs (or other signal power measurements) are received as vector field intensity indications, the threshold comparison value may equal the value of an RSSI (or a mathematical relationship between multiple RSSIs). In still another example embodiment, the vector field intensity indication(s) may be converted to different units (e.g., units associated with HAC or SAR regulations or other units). For example, during testing of a device or a device design, a table may be populated and stored within the device (e.g., in data storage 116, FIG. 1), which correlates (for each frequency band of interest) HAC and/or SAR values with voltages produced by one or more electric field sensors, currents produced by one or more magnetic field sensors, RSSI values, and/or other types of vector field intensity indications. Table 1, below, illustrates an example of such a table for correlating voltages with electric field-related HAC values for a particular device. Additional fields could be included for vector field intensity indications in the form of currents, RSSI, magnetic field-related HAC values, and so on:

TABLE 1

Voltage versus HAC values

| Vector Field Intensity (volts) | Electric Field HAC Value (dBV/m) |
|---|---|
| 0.55 | 26.0 |
| 0.60 | 32.0 |
| 0.65 | 37.0 |
| 0.70 | 41.0 |
| 0.75 | 44.0 |
| 0.80 | 46.0 |
| 0.85 | 47.0 |
| 0.90 | 47.5 |
| 0.95 | 48.0 |
| 1.00 | 48.5 |
| 1.05 | 49.0 |
| 1.10 | 49.5 |
| 1.15 | 50.0 |

In an embodiment in which the vector field intensity indication is a voltage and in which the voltage is converted to a HAC value in block 804, a table such as Table 1 above may be used to perform the conversion, and the threshold comparison value thus may be determined in the same units as the HAC Act regulations (e.g., dBV/m) (or some other unit). For example, when a voltage of 0.95 volts is produced by an electric field sensor, the processing system may convert the voltage to a HAC value of 48.0 dBV/m using Table 1. As will be described below, a table such as Table 1, above, also or alternatively may be used during device design and testing to determine various thresholds (e.g., first and second thresholds, discussed below). For purposes of example only, a threshold comparison value in the units of voltage (e.g., a voltage derived from vector field intensity indications from one or more electric field sensors) will be described below. It is to be understood that alternate embodiments may include threshold comparison values in different units.

In block 806, the threshold comparison value is compared with a first threshold to determine whether the threshold comparison value is less than (or less than or equal to) the first threshold. According to an embodiment, the first threshold is a value in the same units of measurement as the threshold comparison value. For example, when the threshold comparison value is in the unit of voltage, the first threshold is in the unit of voltage. Alternatively, when the threshold comparison value is in some other unit (e.g., amps, watts, dBV/m, dBA/m or some other unit), the first threshold is in the same type of unit.

According to an embodiment, the first threshold corresponds to a pre-defined limit that the device is controlled (as will be described more fully below) not to exceed in conjunction with RF transmissions. For example, the first threshold may correspond to an upper HAC Act defined limit on electric fields that may be produced by the device (e.g., 48.5 dBV/m for transmissions under 1 GHz). In such a case, the first threshold may coincide precisely with the upper HAC Act defined limit. Alternatively, the first threshold may have a value that coincides with a HAC value that is higher or lower than the HAC Act defined limit by some margin (e.g., 5 percent of the upper HAC Act defined limit or some other margin). Alternatively, the first threshold may correspond to a HAC Act defined limit associated with magnetic fields, a SAR limit, and/or another limit. During the design and/or testing process, the first threshold may be defined and stored within the device (e.g., in data storage 116, FIG. 1). For example, the first threshold may be determined during design and testing using a table such as Table 1, above. As a more specific example, the first threshold may be defined to correspond with the upper HAC Act limit on electric fields (or magnetic fields). Assuming, for example, that Table 1 accurately reflects the correlation between HAC values and voltages produced by an electric field sensor, a voltage of 1.0 volts corresponds with a HAC value of 48.5 dBV/m (e.g., the current upper limit for electric fields defined by the HAC Act). Accordingly, the first threshold may equal 1.0 volts.

When the threshold comparison value is not less than (or less than or equal to) the first threshold (i.e., the threshold comparison value is greater than or equal to (or simply greater than) the first threshold), adjustments are made to decrease the radiated power produced by the device, in block 808. According to an embodiment, a decrease in the radiated power may be achieved by adjusting one or more values of tunable components (e.g., components of circuits 106, 110, 111, FIG. 1) that affect the radiation efficiency of the device. For example, the impedance provided by one or more tunable circuits (e.g., one or more of circuits 106, 110, 111, FIG. 1) may be increased via component value adjustments, when such an increase is known to cause a decrease in radiated power, or the impedance provided by one or more tunable circuits may be decreased via component value adjustments, when such a decrease is known to cause a decrease in radiated power. According to another embodiment, decreasing the radiated power may be achieved by reducing the amplification applied by the device's transmitter (or more particularly the amplification applied by the transmitter's power amplifier). These various types of adjustments were discussed in detail, above. After performing block 808, the process may iterate as shown in FIG. 8. A single iteration of block 808 may not result in a radiated power decrease that is sufficient to pull the threshold comparison value below the first threshold. If not, blocks 802-808 will be repeated one or more times until the threshold comparison value does drop below the first threshold.

When the threshold comparison value is less than (or less than or equal to) the first threshold, as determined in block 806, the threshold comparison value may be compared with a second threshold to determine whether the threshold comparison value is less than (or less than or equal to) the second threshold, in block 810. According to an embodiment, the second threshold has a value that is less than the first threshold. For example, the second threshold may have a value that is 10 to 20 percent less than the first threshold, although the second threshold may have a value that is closer to or further from the first threshold, as well.

According to an embodiment, the second threshold corresponds to a pre-defined limit that the device is controlled (as will be described more fully below) not to fall below in conjunction with RF transmissions. For example, the second threshold may have a value that corresponds to a defined number of dBV/m below an upper HAC Act defined limit on electric fields that may be produced by the device (e.g., 10 to 20 percent below 48.5 dBV/m for transmissions under 1 GHz). Alternatively, the second threshold may have a value that corresponds to a defined number of dBA/m below a HAC Act defined limit associated with magnetic fields, a value that corresponds to a value below a SAR limit, and/or a value that corresponds to a value below some other limit. During the design and/or testing process, the second threshold may be defined and stored within the device (e.g., in data storage 116, FIG. 1). Assume, for example, that Table 1 accurately reflects the correlation between HAC values and voltages produced by an electric field sensor, the first threshold equals a voltage of 1.0 volts (which corresponds with a HAC value of 48.5 dBV/m), and the second threshold is defined to be 10 percent lower than the first threshold. In such a case, the second threshold equals 0.9 volts (which corresponds with a HAC value of 47.5 dBV/m).

When the threshold comparison value is not less than (or less than or equal to) the second threshold (i.e., the threshold comparison value is greater than or equal to (or simply greater than) the second threshold), the method iterates as shown, and a radiated RF power adjustment is not made. Conversely, when the threshold comparison value is less than the second threshold, adjustments are made to increase the radiated power produced by the device, in block 812. According to an embodiment, an increase in the radiated power may be achieved by adjusting one or more values of tunable components (e.g., components of circuits 106, 110, 111, FIG. 1) that affect the radiation efficiency of the device. For example, the impedance provided by one or more tunable circuits (e.g., one or more of circuits 106, 110, 111, FIG. 1) may be decreased via component value adjustments, when such a decrease is known to cause an increase in radiated power, or the impedance provided by one or more tunable circuits may be increased via component value adjustments, when such an increase is known to cause an increase in radiated power. According to another embodiment, increasing the radiated power may be achieved by increasing the amplification applied by the device's transmitter (or more particularly the amplification applied by the transmitter's power amplifier). These various types of adjustments were discussed in detail, above. After performing block 812, the process may iterate as shown in FIG. 8. A single iteration of block 812 may not result in a radiated power increase that is sufficient to pull the threshold comparison value above the second threshold. If not, blocks 802, 804, 810, 812 will be repeated one or more times until the threshold comparison value rises above the second threshold.

As FIG. 8 and the associated description indicate, embodiments enable the radiated RF power of a wireless device to be controlled, based on sensed vector fields, to have values that fall between a first threshold and a second threshold. Accordingly, the system is configured and adapted to maintain the radiated RF power at a level that may be close to, but not exceeding, a pre-defined limit (e.g., the first threshold that may correspond with an upper HAC or SAR limit), rather than allowing the radiated RF power level to drift excessively far below the pre-defined limit. In addition, comparison of the threshold comparison value with a second threshold establishes system hysteresis, thus avoiding rapid switching between power increases and decreases around a single threshold.

The sequence of process blocks illustrated in FIG. 8 represent just one example of an order in which the process blocks may be performed, and the depicted sequence is not intended to limit the scope of the inventive matter only to the depicted order. Instead, it is to be understood that, in alternate embodiments, some or all of the process blocks illustrated in FIG. 8 may be performed in different orders, may be performed in parallel, may be combined together, may be expanded into multiple sub-processes, and/or may include one or more intermediate processes that are not illustrated.

Figure 9:
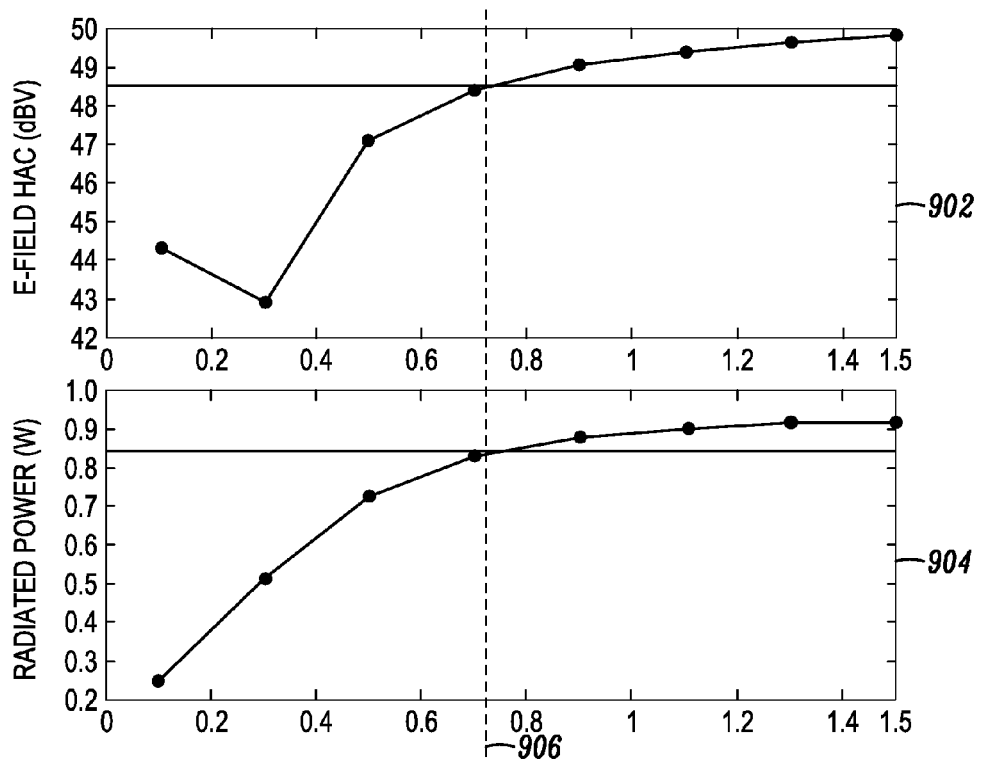
FIG. 9 illustrates charts of HAC measurements and radiated power for a wireless communication device in a free-space condition.
Figure 10:
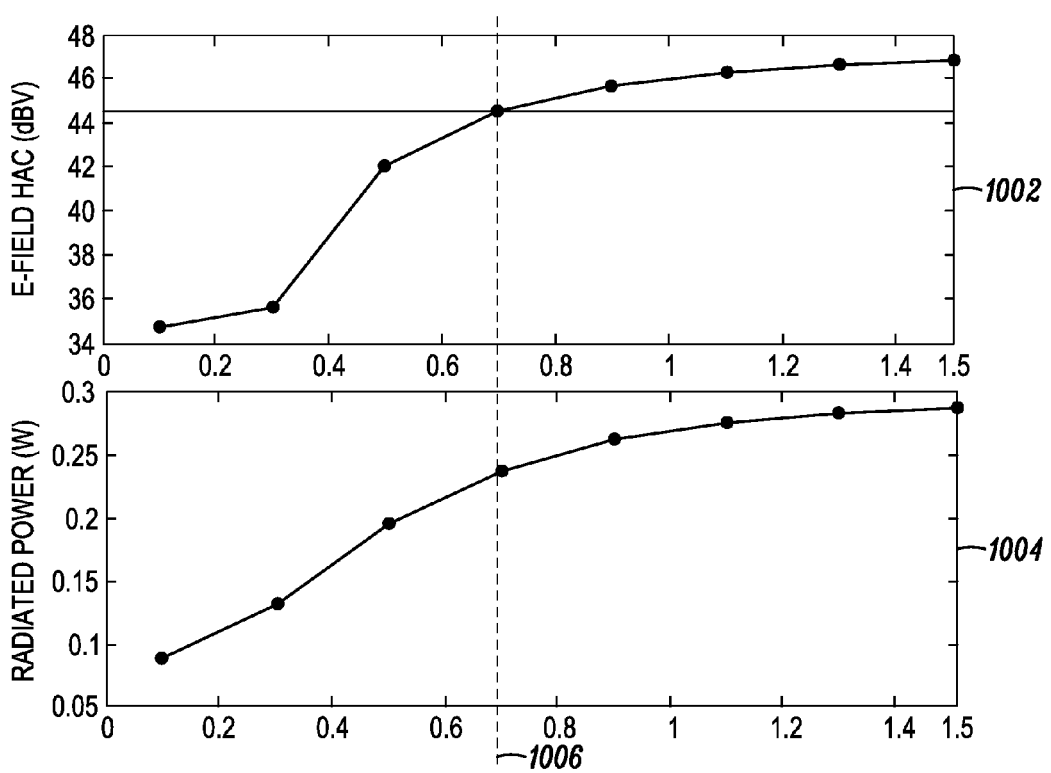
FIG. 10 illustrates charts of HAC measurements and radiated power for a wireless communication device in a hand held condition.

FIGS. 9 and 10 are provided to illustrate the effects of varying a component value of a circuit (e.g., one of circuits 106, 110, 111, FIG. 1) on the RF power radiated by a device. More particularly, FIGS. 9 and 10 assume that the variable component is a capacitor of such a circuit. It is to be understood that, in other embodiments, the values or states of other types of components may be varied, and/or the values or states of multiple components may be varied, and/or power control parameters may be adjusted to affect the RF power radiated by a device.

FIG. 9 illustrates an electric field measurement chart 902 and a radiated RF power chart 904 for a wireless communication device in a free-space condition. In both charts 902, 904, the horizontal axis corresponds to the value of a capacitor (in pF) of a matching or tuning circuit (e.g., one of circuits 106, 110, 111, FIG. 1). Radiated RF power chart 904 illustrates that, as the value of the capacitor is increased, the radiated RF power also increases. Similarly, electric field measurement chart 902 illustrates that, after a value of approximately 0.3 pf, as the value of the capacitor (and thus the radiated RF power) is increased, the electric field also increases. At a capacitor value of about 0.72 pF, as indicated by dashed vertical line 906, the electric field coincides with an upper HAC limit of 48.5 dBV/m. This corresponds with a radiated power value of about 0.83 W. Accordingly, in order not to exceed the upper HAC limit of 48.5 dBV/m, the capacitor value should not be adjusted to exceed 0.72 pF, and the radiated power should not be permitted to exceed 0.83 W, as such excesses may cause the RF radiation to exceed the upper HAC limit.

As discussed previously, the degree of contact between a wireless telephone and a user's body (e.g., the user's hand and head) may significantly and detrimentally affect the radiation efficiency of energy-radiating components of the telephone. Accordingly, an antenna that is tuned to radiate RF power at a level at or just below HAC compliant levels in a free-space condition will become detuned, and thus radiate significantly less RF power, when the wireless telephone is held in a user's hand and/or up against a user's head. Such a phenomenon is illustrated in FIG. 10.

More particularly, FIG. 10 illustrates a HAC measurement chart 1002 and a radiated RF power chart 1004 for the same wireless communication device as was characterized in FIG. 9, but in a hand held condition rather than a free-space condition. Once again, radiated RF power chart 1004 illustrates that, as the value of the capacitor is increased, the radiated RF power also increases. Similarly, electric field measurement chart 1002 illustrates that, as the value of the capacitor (and thus the radiated RF power) is increased, the electric field also increases. However, at a capacitor value of about 0.72 pF, as indicated by dashed vertical line 1006, the electric field only coincides with a HAC value of about 44.5 dBV/m, which is significantly below the upper HAC limit of 48.5 dBV/m. Accordingly, the capacitor value may be adjusted to exceed 0.72 pF without causing the RF radiation to exceed the upper HAC limit. Embodiments of methods and apparatus for controlling the radiated RF power of a wireless device enable the device to respond to environmental conditions that cause a decrease in radiated RF power, by sensing the decrease in radiated power, and adjusting the radiated power toward, but not exceeding, pre-defined limits (e.g., HAC and/or SAR limits).

Thus, various embodiments of radiated RF power control systems and methods in wireless communication devices have been described. An embodiment includes a method for controlling radiation of RF energy by a wireless communication device that includes a transmitter and an antenna. The method is performed by the wireless communication device and includes the steps of producing radiated RF energy by the wireless communication device, sensing, by a vector field sensor of the wireless communication device, an intensity of a vector field resulting from the radiated RF energy, and determining whether the intensity is greater than a first threshold. When the intensity is greater than the first threshold, the method includes decreasing the radiated RF energy produced by the wireless communication device.

Another embodiment includes a wireless communication device with a transmitter, an antenna, a vector field sensor, and a processing system. The transmitter is configured to produce an analog RF signal. The antenna, which is operably coupled with the transmitter, is configured to radiate the analog RF signal into an environment. The vector field sensor is configured to sense an intensity of a vector field resulting from the analog RF signal radiated by at least the antenna. The processing system, which is operably coupled with vector field sensor, is configured to determine whether the intensity is greater than a first threshold, and when the intensity is greater than the first threshold, to cause radiated RF energy produced by the wireless communication device to be decreased.

While the principles of the inventive subject matter have been described above in connection with specific systems, apparatus, and methods, it is to be clearly understood that this description is made only by way of example and not as a limitation on the scope of the inventive subject matter. Further, the phraseology or terminology employed herein is for the purpose of description and not of limitation. For example, the term "coupled," as used herein, is defined as directly or indirectly connected in an electrical or non-electrical manner.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter, it being understood that various changes may be made in the function and arrangement of elements described in an exemplary embodiment without departing from the scope of the inventive subject matter as set forth in the appended claims and their legal equivalents.

The foregoing description of specific embodiments reveals the general nature of the inventive subject matter sufficiently that others can, by applying current knowledge, readily modify and/or adapt it for various applications without departing from the general concept. Therefore, such adaptations and modifications are within the meaning and range of equivalents of the disclosed embodiments. The inventive subject matter embraces all such alternatives, modifications, equivalents, and variations as fall within the spirit and broad scope of the appended claims and their legal equivalents.

What is claimed is:

1. A method for controlling radiation of radio frequency (RF) energy by a wireless communication device that includes a transmitter and an antenna, the method performed by the wireless communication device and comprising the steps of:
   producing radiated RF energy by the wireless communication device;
   sensing, by a vector field sensor that is positioned within a portion of the wireless communication device that corresponds to a Hearing Aid Compatibility (HAC) grid, an intensity of a vector field within the portion of the device that corresponds to a particular measurement area of the HAC grid within which an intensity measurement taken during device testing was highest, when compared with intensity measurements taken during the device testing within measurement areas other than the particular measurement area, wherein the vector field results from the radiated RF energy;
   determining whether a value representing the intensity is greater than a first threshold; and
   when the value is greater than the first threshold, decreasing the radiated RF energy produced by the wireless communication device.

2. The method of claim 1, wherein decreasing the radiated RF energy comprises adjusting one or more values of one or more impedance matching components to cause a decrease in the radiated RF energy.

3. The method of claim 1, wherein decreasing the radiated RF energy comprises adjusting power control parameters of the transmitter to cause a decrease in the radiated RF energy.

4. The method of claim 1, further comprising the steps of:
   determining whether the value is less than a second threshold, wherein the second threshold has a lower value than the first threshold; and
   when the value is less than the second threshold, increasing the radiated RF energy produced by the wireless communication device.

5. The method of claim 4, wherein increasing the radiated RF energy comprises adjusting one or more values of one or more impedance matching components to cause an increase in the radiated RF energy.

6. The method of claim 4, wherein increasing the radiated RF energy comprises adjusting power control parameters of the transmitter to cause an increase in the radiated RF energy.

7. The method of claim 1, wherein the wireless communication device further comprises one or more circuits that include one or more impedance matching components, and wherein the one or more impedance matching components includes one or more capacitors, and wherein decreasing the radiated RF energy is performed by adjusting the one or more values of the one or more capacitors.

8. The method of claim 1, wherein the step of determining whether a value representing the intensity is greater than a first threshold determines whether the value representing the intensity is greater than the Hearing Aid Compatibility limit threshold.

9. The method of claim 1, wherein sensing the intensity of the vector field comprises sensing the intensity of an electric field.

10. The method of claim 1, wherein sensing the intensity of the vector field comprises sensing the intensity of a magnetic field.

11. A method for controlling radiation of radio frequency (RF) energy by a wireless communication device that includes a transmitter and an antenna, the method performed by the wireless communication device and comprising the steps of:
    producing radiated RF energy by the wireless communication device;
    sensing, by a vector field sensor that is position within a portion of the wireless communication device that corresponds to a Hearing Aid Compatibility (HAC) grid that includes a three-by-three array of measurement areas, an intensity of a vector field within the portion of the device that corresponds to a particular measurement area of the HAC grid within which an intensity measurement taken during device testing was highest, when compared with intensity measurements taken during the device testing within measurement areas other than the particular measurement area, wherein the vector field results from the radiated RF energy;
    determining whether a value representing the intensity is greater than a first threshold; and
    when the value is greater than the first threshold, decreasing the radiated RF energy produced by the wireless communication device.

12. A wireless communication device comprising:
    a transmitter configured to produce an analog radio frequency (RF) signal;
    an antenna, operably coupled with the transmitter, and configured to radiate the analog RF signal into an environment, wherein a vector field results from the analog RF signal radiated by the antenna;
    a vector field sensor positioned within a portion of the wireless communication device that corresponds to a Hearing Aid Compatibility (HAC) grid, wherein the vector field sensor is configured to sense an intensity of the vector field in a particular measurement area of the HAC grid within which an intensity measurement taken during device testing was highest when compared with intensity measurements taken during the device testing within measurement areas other than the particular measurement area; and
    a processing system operably coupled with vector field sensor, and configured to determine whether a value representing the intensity is greater than a first threshold, and when the value is greater than the first threshold, to cause radiated RF energy produced by the wireless communication device to be decreased.

13. The device of claim 12, wherein the processing system is further configured to determine whether the value is less than a second threshold, wherein the second threshold has a lower value than the first threshold, and when the value is less than the second threshold, to cause RF energy produced by the wireless communication device to be increased.

14. The device of claim 12, further comprising:
an impedance matching circuit, operably coupled between the antenna and the transmitter, wherein the impedance matching circuit includes one or more impedance matching components, and wherein the processing system is configured to cause the radiated RF energy to be decreased by causing one or more values of the one or more impedance matching components to be adjusted.

15. The device of claim 12, further comprising:
an antenna tuning circuit, operably coupled to the antenna and to the processing system, wherein the antenna tuning circuit includes one or more impedance matching components, and wherein the processing system is configured to cause the radiated RF energy to be decreased by causing one or more values of the one or more impedance matching components to be adjusted.

16. The device of claim 12, wherein the processing system is configured to cause the radiated RF energy to be decreased by adjusting power control parameters of the transmitter to cause a decrease in the radiated RF energy.

17. A wireless communication device, comprising:
a transmitter configured to produce an analog radio frequency (RF) signal;
an antenna, operably coupled with the transmitter, and configured to radiate the analog RF signal into an environment;
a vector field sensor configured to sense an intensity of a vector field resulting from the analog RF signal radiated by at least the antenna; and
a processing system operably coupled with vector field sensor, and configured to determine whether a value representing the intensity is greater than a first threshold, and when the value is greater than the first threshold, to cause radiated RF energy produced by the wireless communication device to be decreased;
a first ground plane;
a second ground plane; and
an impedance matching circuit, operably coupled between the first ground plane and the second ground plane, wherein the impedance matching circuit includes one or more impedance matching components, and wherein the processing system is configured to cause the radiated RF energy to be decreased by causing one or more values of the one or more impedance matching components to be adjusted.

18. A wireless communication device, comprising:
a transmitter configured to produce an analog radio frequency (RF) signal;
an antenna, operably coupled with the transmitter, and configured to radiate the analog RF signal into an environment;
a vector field sensor configured to sense an intensity of a vector field resulting from the analog RF signal radiated by at least the antenna; and
a processing system operably coupled with vector field sensor, and configured to determine whether a value representing the intensity is greater than a first threshold, and when the value is greater than the first threshold, to cause radiated RF energy produced by the wireless communication device to be decreased,
wherein the vector field sensor is positioned within a portion of the device that corresponds to a Hearing Aid Compatibility (HAC) grid that includes a three-by-three array of measurement areas, and wherein the vector field sensor is positioned within a portion of the device that corresponds to a particular measurement area of the HAC grid within which an intensity measurement taken during device testing was highest, when compared with intensity measurements taken during the device testing within measurement areas other than the particular measurement area.

* * * * *